US012748995B2

(12) United States Patent
Doherty et al.

(10) Patent No.: US 12,748,995 B2
(45) Date of Patent: Sep. 29, 2026

(54) QUANTUM INFORMATION PROCESSING DEVICE, ASSEMBLY, ARRANGEMENT, SYSTEM AND SENSOR

(71) Applicant: The Australian National University, Canberra (AU)

(72) Inventors: Marcus William Doherty, Acton (AU); Andrew James Horsley, Acton (AU); Philipp Neumann, Acton (AU)

(73) Assignee: QUANTUM BRILLIANCE PTY LTD, Acton (AU)

( * ) Notice: Subject to any disclaimer, the term of this patent is extended or adjusted under 35 U.S.C. 154(b) by 1159 days.

(21) Appl. No.: 17/761,577

(22) PCT Filed: Sep. 17, 2020

(86) PCT No.: PCT/AU2020/050985
§ 371 (c)(1),
(2) Date: Mar. 17, 2022

(87) PCT Pub. No.: WO2021/051163
PCT Pub. Date: Mar. 25, 2021

(65) Prior Publication Data

US 2022/0374756 A1 Nov. 24, 2022

(30) Foreign Application Priority Data

Sep. 18, 2019 (AU) ................................ 2019903476

(51) Int. Cl.
*G06N 10/40* (2022.01)
*G01J 1/58* (2006.01)
(Continued)

(52) U.S. Cl.
CPC ............. *G06N 10/40* (2022.01); *G06N 10/70* (2022.01); *G01J 1/58* (2013.01); *G01N 21/8806* (2013.01)

(58) Field of Classification Search
CPC ........... H05K 3/00; G06N 10/00; B82Y 10/00
See application file for complete search history.

(56) References Cited

U.S. PATENT DOCUMENTS 9,823,313 B2 11/2017 Hahn et al.
2014/0306707 A1* 10/2014 Walsworth ......... G01R 33/4616
324/309

(Continued)

OTHER PUBLICATIONS

Abele et al., Permanent Conical Magnet for Interventional Magnetic Resonance Imaging, Sep. 2004, IEEE Transactions on Magnetics, vol. 40, No. 5, pp. 3382-3386 (Year: 2004).*

(Continued)

*Primary Examiner* — Bumsuk Won
*Assistant Examiner* — Samanvitha Sridhar
(74) *Attorney, Agent, or Firm* — Nelson Mullins Riley & Scarborough LLP; Anthony A. Laurentano

(57) ABSTRACT

This disclosure relates to an integrated quantum information processing device with host chips having a body. Each body has a first surface, a second surface opposite the first surface, a defect cluster, and optical structures to direct excitation light that has entered the host chip toward the defect cluster and to direct fluorescent light emitted by the defect cluster to exit the host chip. A base chip has a first side coupled to the second surface of each host chip, a second side, an electromagnetic signal guiding structure to guide electromagnetic control signals toward the defect cluster. A magnetic field is aligned with a spin axis at a colour centre of the defect cluster and enables initialisation and readout of nuclear spin states of the colour centre. For each host chip the defect cluster is located proximate the respective second surface relative to the first surface.

21 Claims, 11 Drawing Sheets

(51) Int. Cl.
*G06N 10/70* (2022.01)
*G01N 21/88* (2006.01)

(56) References Cited

U.S. PATENT DOCUMENTS

| | | | | |
|---|---|---|---|---|
| 2016/0018269 | A1* | 1/2016 | Maurer | G01K 11/20<br>374/121 |
| 2019/0235031 | A1 | 8/2019 | Ibrahim et al. | |
| 2019/0325337 | A1* | 10/2019 | Reilly | G06N 10/70 |

OTHER PUBLICATIONS

Smits, J. et al., Two-dimensional nuclear magnetic resonance spectroscopy with a microfluidic diamond quantum sensor, Jul. 26, 2019, Sci. Adv., 5, pp. 1-7 (Year: 2019).*
Search Report and Written Opinion for corresponding international application No. PCT/AU2020/050985, dated Nov. 23, 2020.
Mouradian, S.L., "A Scalable Quantum Computation Platform: Solid State Quantum Memories Coupled to Photonic Integrated Circuits," Massachusetts Institute of Technology, 2018.
Pfender, M., et al., "Protecting a Diamond Quantum Memory by Charge State Control," Nano Letters, vol. 17, No. 10, 2017.
Smits, J., et al., "Two-Dimensional Nuclear Magnetic Resonance Spectroscopy with a Microfluidic Diamond Quantum Sensor," Science Advances, vol. 5, No. 7, Jul. 26, 2019.
Wan, N.H., et al., Efficient Extraction of Light from a Nitrogen-Vacancy Center in a Diamond Parabolic Reflector, Nano etters, vol. 18, No. 5, 2018.
Australian International-type Search for Provisional Patent Application for corresponding application No. 2019903476, dated Feb. 19, 2020.
International Preliminary Report of Patentability (Chapter II of the Patent Cooperation Treaty) for corresponding International application No. PCT/AU2020/050985, dated Jan. 13, 2022.
Written Opinion of the International Preliminary Examining Authority for corresponding International application No. PCT/AU2020/050985, dated May 14, 2021.
Bayat, K.. et al., "Efficient, Uniform, and Large Area Microwave Magnetic Coupling to NV Centers in Diamond Using Double Split-Ring Resonators," Nano Letters, vol. 14 (3): 1208-1213 (2014).
Boss, J.M., et al., "Quantum sensing with arbitrary frequency resolution," arViv:1810.0156v1, 26 pages [2017].
Extended European search report, EP Application No. 20864827.9, dated Sep. 22, 2023, 21 pages.
Kim, D. et al., "CMOS-Integrated Diamond Nitrogen-Vacancy Quantum Sensor," arViv:1810.0156v1, 7 pages [2018].
Momenzadeh, S. et al., "Nanoengineered Diamond Waveguide as a Robust Bright Platform for Nanomagnetometry Using Shallow Nitrogen Vacancy Centers," Nano Letters, vol. 15(1): 165-169 (2014).
Zongmin, M. et al., "Efficient microwave radiation using broadened-bandwidth coplanar waveguide resonator on assembly of nitrogen-vacancy centers in diamond," Japanese Journal of Applied Physics, vol. 58 (5): 7 pages (2019).

* cited by examiner

QUANTUM INFORMATION PROCESSING DEVICE, ASSEMBLY, ARRANGEMENT, SYSTEM AND SENSOR

CROSS-REFERENCE TO RELATED APPLICATIONS

The present application claims priority from Australian Provisional Patent Application No 2019903476 filed on 18 Sep. 2019, the contents of which are incorporated herein by reference in their entirety.

TECHNICAL FIELD

The present invention relates to quantum information processing.

BACKGROUND

A defect centre quantum information processor is based on one or more defect clusters in a host material. Such defect clusters are comprised of a defect with an optically addressable electronic spin, and nearby nuclear spins. The nuclear spins and electronic spin form a quantum information processing (QIP) unit, with the electronic spin acting as a quantum bus to initialise and read out the nuclear spin states, which act as qubits. One or more QIP units can be used as a quantum computer. The electronic spin can also be used as a sensor of its environment, with the nearby nuclear spins used to enhance the sensing capability. One particular realisation of a defect centre quantum information processor uses diamond as a host material. The defect clusters are comprised of a nitrogen-vacancy (NV) centre, with both an electronic spin and a nitrogen nuclear spin, and nearby nuclear spins, such as those from $^{13}C$ atoms in the diamond lattice. Another potential realisation uses divacancy centres in silicon-carbide (SiC), whose electronic spin behaves similarly to the diamond NV centre, surrounded by nearby nuclear spins in the SiC lattice.

High-fidelity single-shot readout of nuclear spin states is important for quantum information processing. The fidelity of the single-shot readout is strongly dependent on the nuclear Ti lifetime during readout. In order to achieve high fidelities, the nuclear Ti lifetime during readout is extendable by applying a magnetic field. The alignment of this magnetic field to the quantisation axis of the electronic spin is important for single shot readout fidelity.

Referring to FIG. 1 there is shown a block diagram illustrating a standard diamond quantum computer 100. The standard diamond quantum computer includes a controller 120 operably coupled to an optical apparatus 130, microwave and radio frequency sources 140 and a magnetic apparatus 150. The optical apparatus 130 includes one or more pulsed laser systems, a microscope objective lens, a photon detector, and a positioning system for aligning the optical path to the defect cluster in a quantum processor 110. The positioning system of the optical apparatus 130 can include an XYZ nano- or micro-positioning stage, or a combination of Z-axis nano-positioning or micro-positioning stage with an XY galvo mirror scanning assembly. The magnetic apparatus 150 comprises of a magnetic field generating apparatus and a positioning system for aligning an inhomogeneous magnetic field, generated by the magnetic field generating apparatus, with an NV axis of a quantum processor 110. The positioning system of the magnetic apparatus 150 comprises a XYZ micro-positioning stage. The quantum processor 110 is often mounted on an XYZ stage to facilitate coarse alignment with the optical and magnetic apparatuses. This XYZ stage is typically manually operated.

The controller 120 is configured to control generation of laser, microwave and/or radio frequency pulses, and the inhomogeneous magnetic field directed toward the quantum processor 110. The controller 120 accurately controls the positioning system of the optical apparatus to align the optical path to the defect cluster, and the positioning system of the magnetic apparatus 150 to align the magnetic field with the NV axis of the quantum processor 110. The controller 120 is able to analyse the light emitted by the quantum processor 110 and captured by the optical apparatus to read out the quantum state of the quantum computer 130.

One disadvantage of current quantum computing assemblies is that the positioning systems for the quantum processor 110, optical apparatus 130 and magnetic apparatus 150 are expensive and bulky, adding complexity and mechanical instability. Furthermore, in current quantum computing assemblies there is typically a tradeoff between optical access to the defect cluster and efficient coupling of electromagnetic control fields, caused by the microwave and/or radio frequency pulses, with the defect cluster. Additionally, in current quantum computing assemblies the microscope objective lens is bulky and expensive.

SUMMARY

It is an object of the present invention to substantially overcome, or at least ameliorate, one or more disadvantages of existing arrangements.

In a first aspect there is provided an integrated quantum information processing device comprising: one or more host chips, each host chip having a body, each body having a first surface, a second surface opposite the first surface, a defect cluster, and one or more optical structures formed in the respective body to direct excitation light that has entered the host chip toward the respective defect cluster and to direct fluorescent light emitted by the respective defect cluster to exit the respective host chip; and a base chip having a first side coupled to the second surface of each host chip of the plurality of host chips, a second side, an electromagnetic signal guiding structure configured to guide electromagnetic control signals toward the defect cluster of each host chip, wherein the electromagnetic control signals have a frequency within at least one of a microwave or a radio frequency range; wherein a magnetic field aligned with a spin axis at a colour centre of each defect cluster enables at least one of initialisation and readout of nuclear spin states of the respective colour centre of the respective defect cluster, and for each host chip the respective defect cluster is located proximate the respective second surface relative to the first surface.

In a second aspect there is provided an integrated quantum information processing assembly, comprising: the integrated quantum information processing device of the first aspect; and a magnetic apparatus integrated with the base chip.

In a third aspect there is provided a quantum information processing arrangement, comprising: the integrated quantum information processing device of the first aspect; and a magnetic apparatus located proximate and separate to the base chip.

In a fourth aspect there is provided a quantum sensor comprising: a quantum information processing assembly configured according to the second aspect or the quantum information processing arrangement configured according to the third aspect, further comprising a sample structure.

In a fifth aspect there is provided a quantum information processing system, comprising: an integrated quantum information processing assembly configured according to the second aspect or a quantum information processing arrangement configured according to the third aspect, comprising a plurality of defect clusters; a modulator; a light source; an electromagnetic control signal source configured to emit control signals which have a frequency within a radio frequency range or a microwave frequency range; one or more photon detectors; and a controller operatively coupled to the light source, the electromagnetic control signal source, and the one or more photon detectors, wherein the controller is configured to: actuate the light source to generate one or more beams of excitation light which are modulated by the modulator, such that one or more beams of excitation light, as modulated, are transmitted to individually optically address at least some of the plurality of defect clusters; actuate the electromagnetic control signal source to individually address the at least some of the plurality of the defect clusters; and receive one or more signals from the one or more photon detectors in response to fluorescent light being emitted by the at least some of the plurality of defect clusters which were individually addressed.

In a sixth aspect there is provided a method of manufacturing an integrated quantum information processing device, comprising: etching in a host substrate a plurality of host chips; detaching at least some of the plurality of host chips from the host substrate, wherein each host chip has a body, the body having a first surface, a second surface opposite the first surface, and a defect cluster; and mounting the removed host chips to a base chip having a first side coupled to the second surface of the body of each host chip, a second side, an electromagnetic signal guiding structure configured to guide electromagnetic control signals towards the defect cluster of each host chip, wherein each host chip has one or more optical structures formed in the body to direct excitation light that has entered the respective host chip toward the defect cluster and to direct fluorescent light emitted by the defect cluster to exit the respective host chip, and for each host chip the respective defect cluster is located proximate the respective second surface relative to the first surface.

Other aspects and embodiments will be appreciated throughout the description of the embodiments.

BRIEF DESCRIPTION OF DRAWINGS

Example embodiments should become apparent from the following description, which is given by way of example only, of at least one preferred but non-limiting embodiment, described in connection with the accompanying figures.

DESCRIPTION OF EMBODIMENTS

Figure 1:
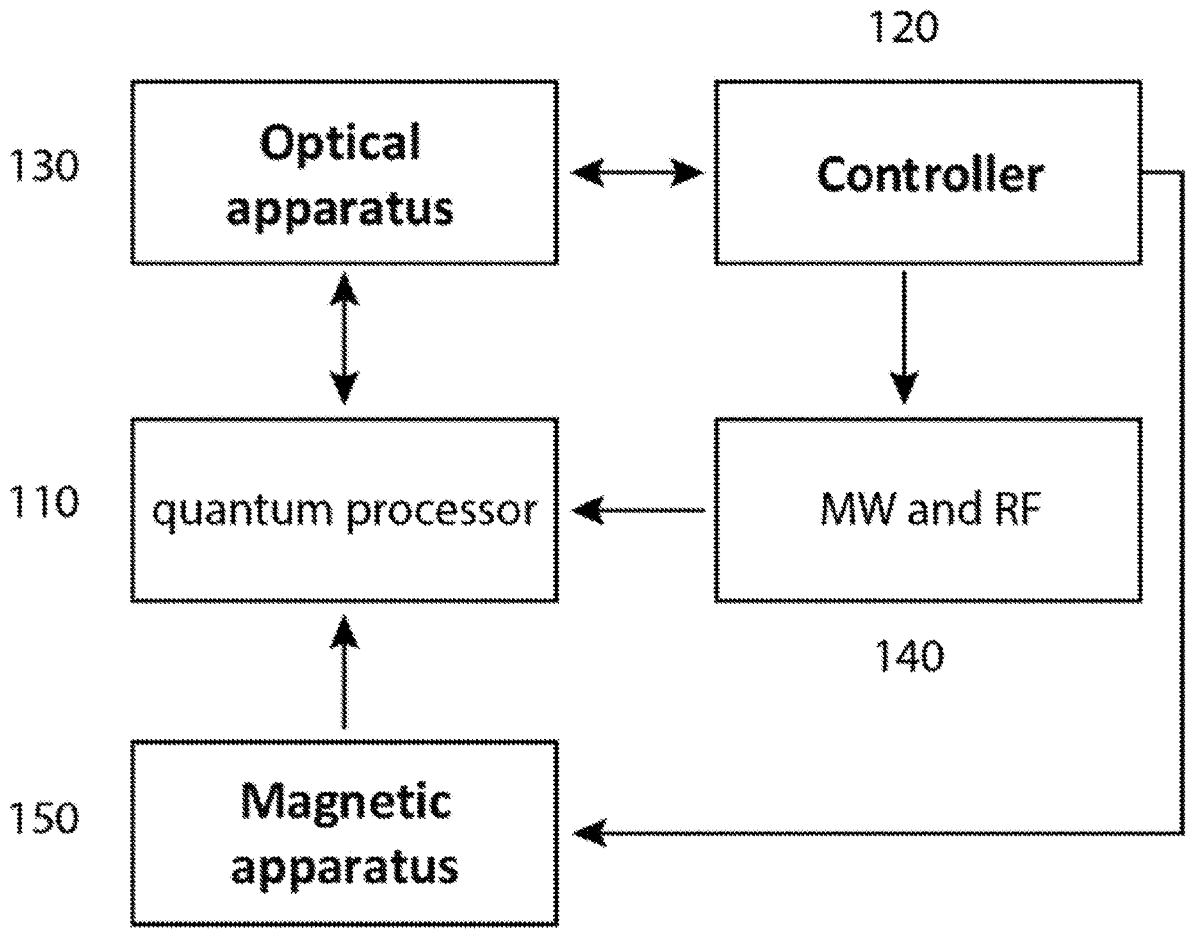
FIG. 1 is a block diagram of an example of a prior art diamond quantum computer.

The following examples are described in order to provide a more precise understanding of the subject matter of a preferred embodiment or embodiments. In the figures, incorporated to illustrate features of an example embodiment, like reference numerals are used to identify like parts throughout the figures.

Figure 2:
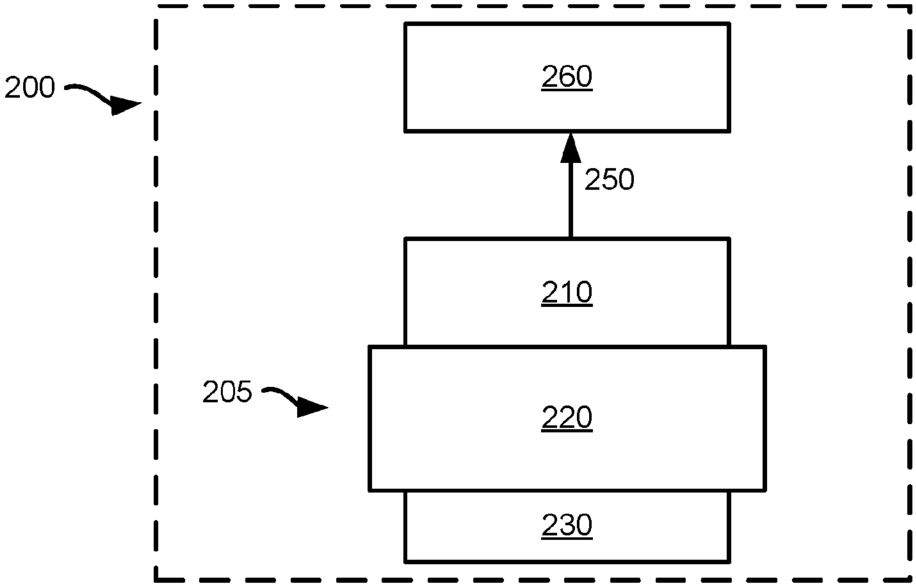
FIG. 2 is a schematic of an example of an integrated quantum information processing assembly comprising of an integrated quantum information processing device.

Referring to FIG. 2 there is shown an example of an integrated quantum computing device 205 which, in this example, forms part of an integrated quantum information processing assembly 200. The integrated quantum computing device 205 comprises a host chip 210 and a base chip 220. The host chip 210 has a body 310 (see FIG. 3) having a first surface 312 (see FIG. 3), a second surface 311 (see FIG. 3) opposite the first surface 312 (see FIG. 3), a defect cluster 320 (see FIG. 3), and one or more optical structures 330/340 (see FIG. 3) formed in the body 310 (see FIG. 3) to direct excitation light that has entered the host chip 210 toward the defect cluster 320 (see FIG. 3) and to direct fluorescent light emitted by the respective defect cluster 320 to exit the respective host chip for detection by an optical apparatus 260 such as a photon detector 850 (see FIG. 8). The base chip 220 has a first side 511 (see FIG. 5) coupled directly or indirectly to the second surface of the body 310 (see FIG. 3), a second side 512 (see FIG. 5), an electromagnetic signal guiding structure 520 configured to guide electromagnetic control signals 240 toward the defect cluster 320 of the host chip 210 (see FIG. 3), wherein the electromagnetic control signals 240 have a frequency within a frequency range extending over microwave and radio frequency ranges. For example, the frequency range extending over the microwave and radio frequency ranges is about 3 kHz to about 300 GHz. A magnetic field aligned with a spin axis at a colour centre of the defect cluster 320 enables at least one of initialisation and readout of nuclear spin states of the respective colour centre of the respective defect cluster 320.

As shown in FIG. 2, the magnetic field at the defect cluster 320 is generated by or contributed to by a magnetic apparatus 230, wherein the integrated quantum information processing assembly 200 comprises the magnetic apparatus 230 which is integrated with the base chip 220 to generate or contribute to the magnetic field at the defect cluster 320. The integrated quantum information processing assembly 200 forms an integrated quantum processor. As will be discussed in further examples, the magnetic apparatus 230 does not necessarily need to be integrated with the integrated quantum information processing device 205.

The integrated quantum information processing device 205 provides one or more significant advantages. The integration of the one or more optical structures on the host chip 210 enhances qubit initialisation and readout fidelity. Furthermore, the use of a separate optical element (relative to the host chip) such as a microscope objective and the associated scanning systems is eliminated, thereby improving mechanical stability, reducing cost, and reducing the size of quantum information processing assemblies, apparatuses, arrangements and systems which utilise the integrated quantum information processing device 205. In addition, by removing the need for a high numerical aperture microscope objective with limited field of view, multiple clusters can be optically addressed with high fidelity over a wide area.

The host chip 210 may be made of various materials which comprise of a defect cluster 320 having an optically addressable electronic spin and nearby nuclear spins. For example, the host chip 210 may be diamond where the defect cluster 320 comprises a colour centre provided in the form of a NV (nitrogen-vacancy) centre and nearby $^{13}C$ atoms, as discussed in Waldherr, G. et al., *Quantum error correction in a solid-state hybrid spin register*, Nature 506, 204-207 (2014). In another form, the host chip 210 may be silicon carbide as discussed in Christle, D. J. et al., *Isolated Spin Qubits in SiC with a High Fidelity Infrared Spin-to-Photon Interface*, Phys. Rev. X 7 021046 (2017), and Christle, D. J. et al., *Isolated electron spins in silicon carbide with millisecond coherence times*, Nat. Mater. 14, 160-163 (2014), the contents of both documents being herein incorporated by reference in their entirety.

Qubit initialisation and readout fidelity from the integrated quantum processing device 205 can be improved in various manners. In one implementation, qubit initialisation and readout fidelity can be improved by enhancing the collection efficiency of fluorescence from the colour centre. In an additional or alternative implementation, qubit initialisation and readout fidelity can be improved by reducing background fluorescence detection by forming a tightly focused optical excitation and fluorescence collection volume in the body 310. Features seeking to provide one or more of these improvements are discussed below.

Figure 3:
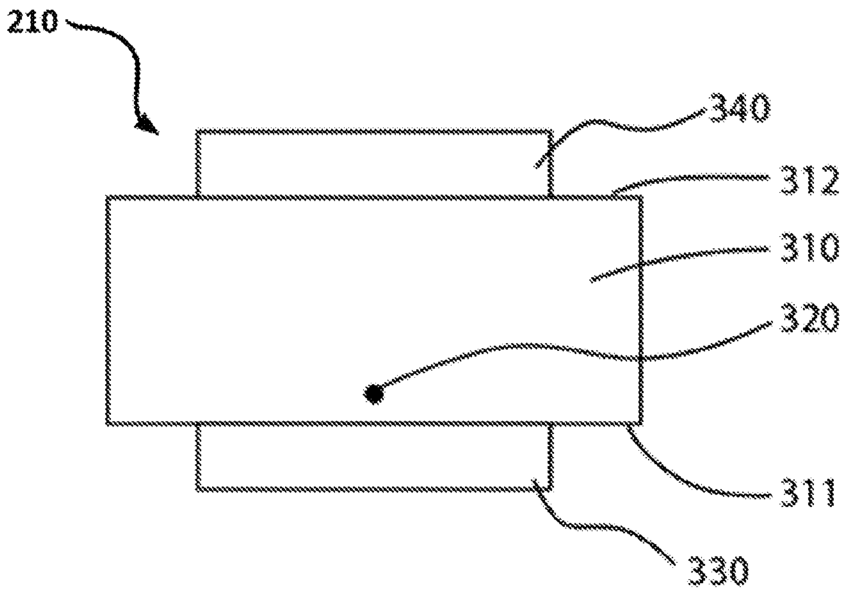
FIG. 3 is a schematic of an example of a host chip of the integrated quantum processing assembly of FIG. 2.

Referring to FIG. 3, optical access to the defect cluster 320 can be achieved through the first surface 312 (i.e. backside) of the host chip 210. As such, the defect cluster 320 can be located proximate to the second surface 311 relative to the first surface 312 which is also proximate to the electromagnetic signal guiding structure 520 (see FIG. 5) provided by the base chip 220 thereby enabling efficient control of the spins in the defect cluster 320 through pulses of electromagnetic control signals, but inhibiting optical access from the frontside (i.e. second surface 311). To minimise optical distortion and background fluorescence, the host chip 210 thickness is preferably minimised.

As shown in FIG. 3, at least some of the one or more optical structures may comprise of a reflective optical structure 330 patterned on the second surface 311 (i.e. frontside) of the host chip 210. The optical structure 330 may be designed to act as a focusing lens, to focus collimated light incident on the host chip 210 onto the defect cluster 320, and to collimate the fluorescent light emitted by the defect cluster 320 to exit to host chip 210 for detection by an optical apparatus 260. The optical structure 330 may be provided in the form of a reflective coating or film which may be applied to the surfaces 312, or a reflective structure formed by removing host material from the body 310, and/or by adding material (e.g. through evaporation or crystal growth) onto surface 312.

As shown in FIG. 3, at least some of the one or more optical structures can include an anti-reflection optical structure 340 where the first surface 312 (i.e. backside) of the host chip 210 can be patterned to minimise reflection. In one form, the anti-reflective optical structure 340 is configured to focus light that has entered the host chip 210 onto the defect cluster 320 and to focus fluorescent light emitted by the colour centre to exit the host chip 210 for detection by the optical apparatus 260. The optical structure 330 may be provided in the form of a non-reflective coating or film which may be applied to the surface 312, or an anti-reflective structure formed by removing host material from the body 310, and/or by adding material (e.g. through evaporation or crystal growth) onto surface 312. The anti-reflective optical structure 340 may be provided in the form of a coating of SiO2 or other suitable coating material. In the instance, the SiO2 coating could be approximately 100 nm+/−20 nm thick in the case of diamond being used for the host chip. In an alternate arrangement, the one or more optical structures can comprise of an unpatterned host chip 210 frontside surface 311 which, due to the host material-air refractive index mismatch creating a reflective surface, can be used as the reflective optical structure.

Figure 4:
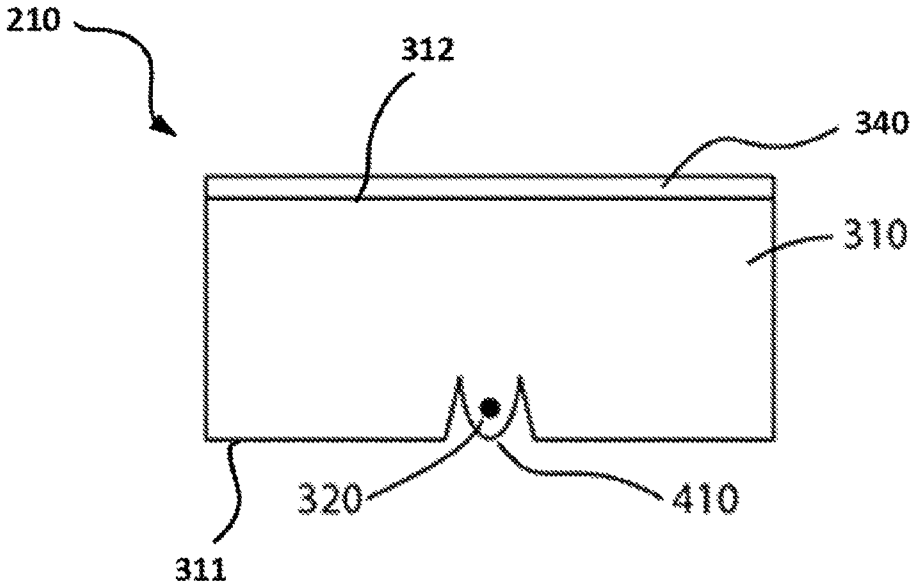
FIG. 4 is a schematic of a further example of a host chip of the integrated quantum processing assembly of FIG. 2.

Referring to FIG. 4 there is shown a specific implementation of the host chip 210 wherein at least some of the one or more optical structures are fabricated into the second surface 311. In one form, the one or more optical structures fabricated into the second surface 311 can be provided in the form of a curved reflective surface, such as a curved micro-mirror or a combined micro-mirror and focusing element. In a further example, the optical structures may comprise a parabolic mirror 410 and positioned with its focus at the defect cluster 320. The curved reflective surface, such as parabolic mirror 410, partially defines the second surface 311 of the body of the host chip 210. The defect cluster 320 is located at a focal point of the parabolic mirror 410. The curved reflective surface, such that the parabolic mirror 410, is configured to reflect and focus excitation light onto the defect cluster 320 and reflect and focus emitted fluorescent light of the colour centre to exit the host chip 210 for detection by the optical apparatus 260. The parabolic mirror 410 provides advantageous fluorescence collection efficiency, with demonstrated efficiencies above 40%, and simulated collection efficiencies over 75%. In one form, the curved reflective surface can have a reflective coating or film to enhance reflection for light incident at angles that are not totally internally reflected. However, in other arrangements, the curved reflective surface can exploit total-internal-reflection at the host-air boundary to operate without a coating or film.

In another form, at least some of the one or more optical structures fabricated into the backside (i.e. first surface 312) of the host chip 210 can include one of a solid immersion lens, a Fresnel solid immersion lens (refractive or diffractive), or a diffractive lens comprising of structures (e.g. nanopillars) where the effective refractive index is modulated by varying the air/host material filling ratio.

Figure 5:
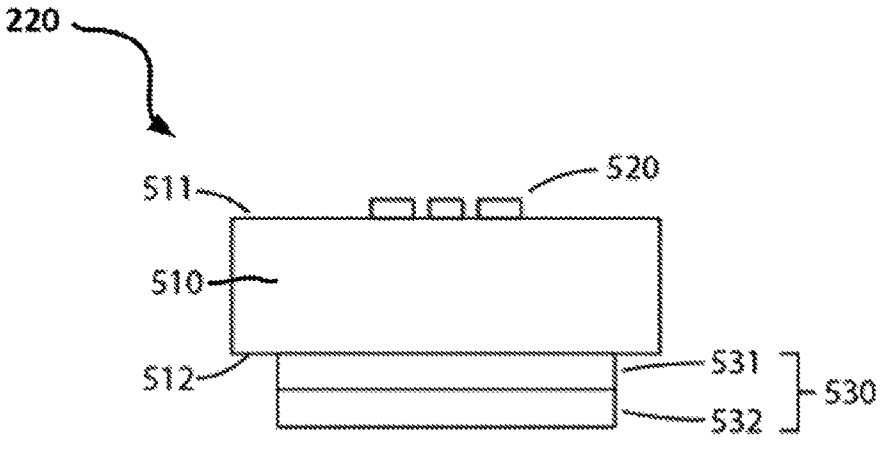
FIG. 5 is a schematic of an example of a base chip of the integrated quantum processing assembly of FIG. 2.

Referring to FIG. 5, there is shown an example of the base chip 220 of the integrated quantum information processing device 205. It will be appreciated from the example discussed in relation to FIG. 2 that the frontside surface 311 of the host chip 210 is coupled directly to the base chip 220. However, as will be discussed in later examples, the base chip 220 can be coupled to the host chip 210 via one or more intermediary devices.

As shown in FIG. 5, the base chip 220 comprises of a substrate 510 with both frontside 511 and backside 512. The substrate frontside 511 comprises of one or more electromagnetic control signal guiding structures 520 to guide externally generated electromagnetic control signals 240 emitted by one or more electromagnetic sources 870 (see FIG. 8) to the defect cluster 320. The substrate 510 is preferably fabricated from a material with high mechanical strength, high thermal conductivity, and low cost. Mechanical strength is required to minimise the substrate thickness, and therefore minimise the separation distance between the defect cluster 320 and the magnetic apparatus 230. High thermal conductivity is required to distribute heat generated by the electromagnetic control signals 240. One suitable substrate material for the base chip 220 is sapphire, which presents high mechanical strength and thermal conductivity, but is much cheaper than other suitable materials such as diamond.

The base chip 220 is designed to maximise the coupling efficiency of the electromagnetic control signals 240 with the defect cluster 320. The base chip 220 allows use of smaller microwave/radio frequency powers to drive the fast quantum gates on the spins in the defect cluster 320 required for high fidelity quantum computation. The reduced electromagnetic power requirements minimise the degradation of quantum computation fidelity caused by electromagnetic induced heating, and minimise the cost and size of the electromagnetic electronics. Efficient electromagnetic coupling is achieved by the electromagnetic control signal guiding structure 520. A single guiding structure 520 can be used for straightforward fabrication, or separate guiding structures 520 can be used and separately optimised for microwave and radio frequencies (e.g. within the frequency range of 3 kHz to 300 GHz). By optically addressing the defect cluster 320 through the diamond backside 311, it is possible to position the electromagnetic control signal guiding structure 520 such that the defect cluster 320 is located where the generated electromagnetic field is both strong and optimally oriented to align with the spin axis of the colour centre.

In one implementation, the electromagnetic control signal guiding structures 520 can be provided in the form of microstrips and coplanar waveguides (CPWs). To ensure optimal orientation of the magnetic field with respect to the spin axis of the colour centre 320, the centre of the microstrip or CPW signal line is positioned directly underneath the defect cluster 320, such that a linearly polarised electromagnetic field generated by the microstrip or CPW signal line causes the net magnetic field at the defect cluster 320 to be oriented substantially perpendicular, and preferably perpendicular, to the spin axis at the defect cluster 320. Johnson noise in the metallic guiding structure provides a minimum separation distance between the defect cluster 320 and guiding structure 520, of several hundred nanometres. To maximise the electromagnetic field amplitude, the width of the microstrip or CPW signal line is kept small, whilst keeping the distance between the defect cluster 320 and the microstrip or CPW small relative to the width of the microstrip or CPW signal line.

In one variation, the electromagnetic signal guiding structure 520 of the base chip 220 can be provided with a reflective structure to reflect and preferably focus light that has exited the host chip 210 back toward the defect cluster 320, resulting in enhanced excitation and readout efficiencies.

Figure 6:
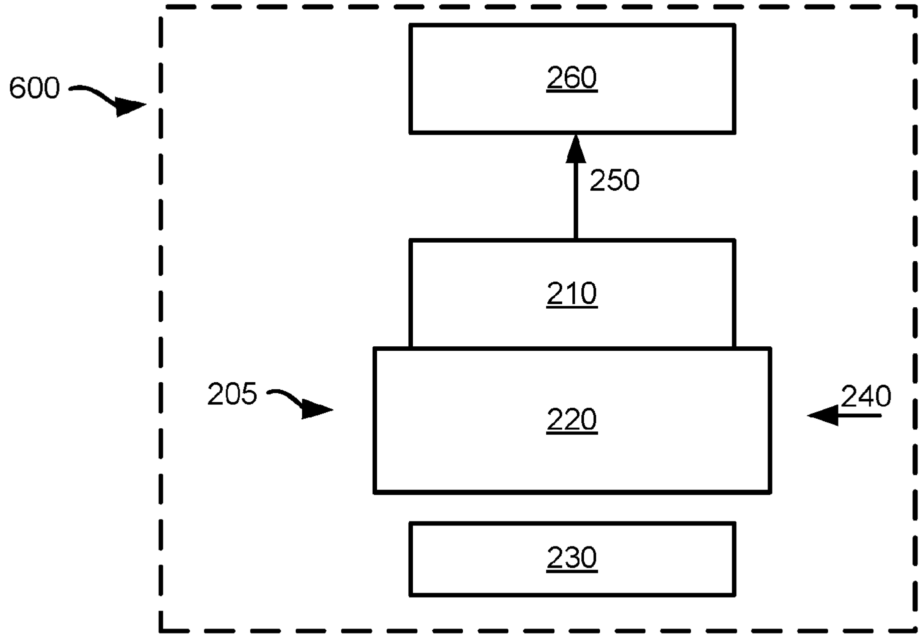
FIG. 6 is a schematic of an example of a quantum information processing arrangement.

Referring to FIG. 6 there is shown an example of a quantum information processing arrangement 600. The quantum information processing arrangement 600 comprises the integrated quantum information processing device 205 discussed in relation to FIGS. 2 to 4. The host chip 210 and base chip 220 of the quantum information processing arrangement 600 are configured in the same manner as exemplified and discussed in relation to FIG. 5. Therefore, for the purposes of clarity and to avoid reduplicating content, it will therefore be appreciated that the described embodiments in relation to the host chip 210 and base chip 220 apply to the embodiment discussed in relation to FIG. 6. However, in contrast to the quantum information processing assembly 200 where the magnetic apparatus 230 is secured to the base chip 220, the magnetic apparatus 230 of the quantum information processing arrangement 600 is located proximate and separate to the base chip 220 to generate the magnetic field in alignment with the defect cluster 320.

The magnetic apparatus 230, whether it is secured to or separated from the base chip 220, can comprise of a permanent magnet material 531 coupled to a high-permeability material 532.

To preserve optical access to the diamond backside 311, a single-sided magnetic apparatus 230 can be used and located near the frontside 311 of the host chip 210 and behind the base chip 220. One or more magnetic components can be used such as one or more permanent magnets. The magnetic flux at the top of the magnets can be enhanced by including a structure made from high-magnetic-permeability material, e.g. high-permeability steel, in a magnetic arrangement. This magnetic arrangement can enable larger magnetic fields at the defect cluster 320, improving qubit initialisation and readout fidelity. Alternatively, such a magnetic arrangement can enable a reduction in the size of the magnets required to produce a given magnetic field at the defect cluster 320.

Figure 7A:
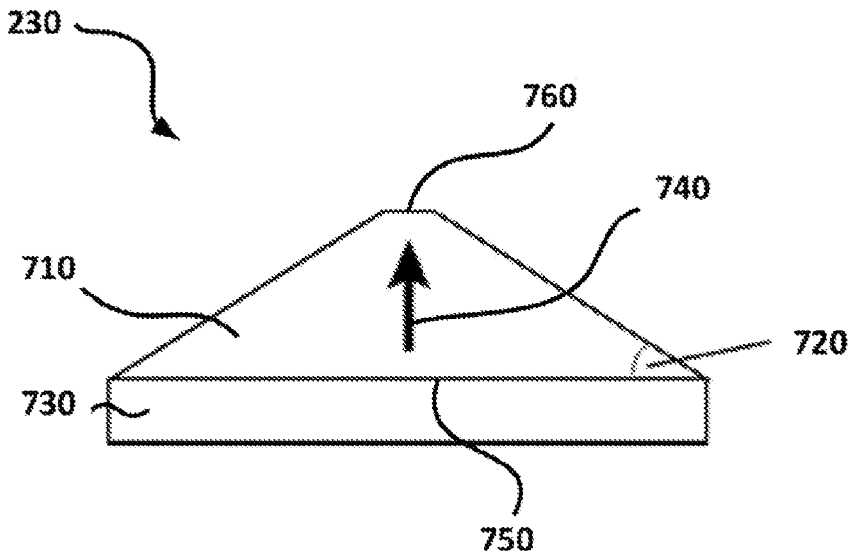
FIG. 7A is a schematic of an example of a magnetic device of the quantum information processing assembly of FIG. 2 and/or the quantum information processing arrangement of FIG. 6.

Referring to FIG. 7A there is shown an example of a magnetic apparatus 230 comprising of one or more magnetic components 710, 730. The magnetic apparatus 230 of FIG. 7A can be part of the integrated quantum information processing assembly 200 where the magnetic apparatus 230 is integrated with the base chip 220 in the sense that it is secured to the base chip 220. Alternatively, the magnetic apparatus 230 of FIG. 7A can form part of the quantum information processing arrangement 600, wherein the magnetic apparatus 230 is located proximate and separate to the base chip 220 and configured to generate or contribute toward the magnetic field at the respective colour centre of each defect cluster 320. In either aspect, the magnetic apparatus 230 comprises of a cone-shaped magnet 710 magnetised along the cone axis 740, with a large diameter base 750 and a small diameter peak 760. This geometry produces a strong magnetic field at the peak of the cone-shaped magnet 710, oriented substantially parallel or parallel to the cone axis 740. The defect cluster 320 is positioned a short distance above the peak 760 of the cone 710 in either aspect despite whether the magnetic apparatus 230 is secured to or positioned near but separated from the base chip 220. The magnetic flux at the peak of the cone 710 can be magnified using a cone geometry defining an angle 720 between the cone base 750 and sides of between 30° to 40° and preferably 35.3°. The magnetic flux at the peak 760 of the cone 710 can be enhanced by attaching a disc of high-permeability material 730, e.g. high-permeability steel, to the base 750 of the cone 710. In experiments that have been conducted using the configuration illustrated in FIG. 7A, the mass of the magnetic apparatus 230 has been miniaturised from 3165*g* to 220*g*.

Figure 7B:
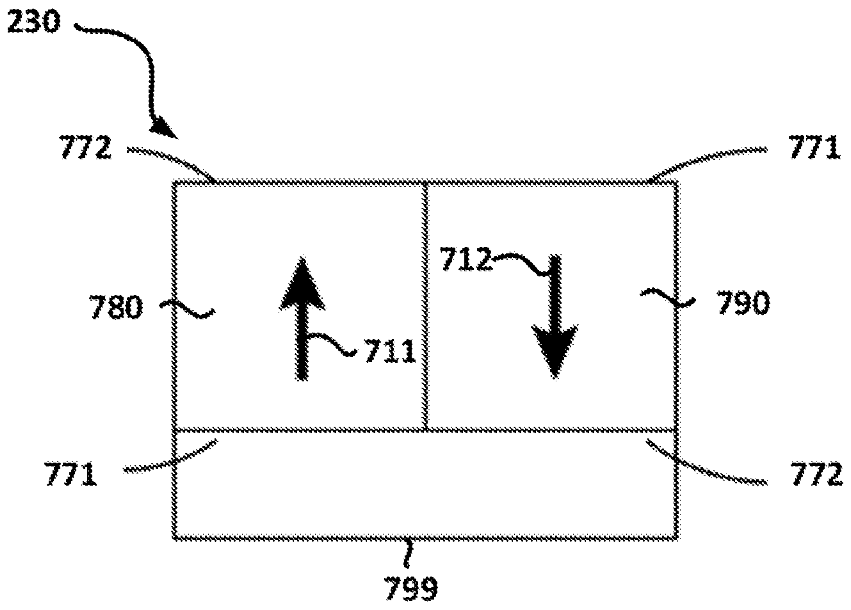
FIG. 7B is a schematic of an alternate example of a magnetic device of the quantum information processing assembly of FIG. 2 and/or the quantum information processing arrangement of FIG. 6.

Referring to FIG. 7B there is shown an alternate implementation of the magnetic apparatus 230 comprising of a pair of magnets 780, 790 with top and bottom faces 771, 772. The magnetic apparatus 230 of FIG. 7B can be secured to the base chip or separated from the base chip as discussed is earlier aspects. The magnets 780, 790 are coupled together such that opposite polarities of the respective magnets are located adjacent to each other. The first magnet 780 is magnetised along the bottom-top direction 795, and the second magnet 790 is magnetised top-bottom 796. The orientation of the first magnet 780 relative to the second magnet 790 produces a strong magnetic field above the magnets 780, 790, with a large range of field orientations. The magnetic flux at the top of the magnets can be enhanced by attaching a block of high-permeability material 799, e.g. high-permeability steel, to the base of the magnet pair 780, 790. In experiments that have been conducted using the configuration illustrated in FIG. 7B, the mass of the magnetic apparatus 230 has been miniaturised from 720*g* to 170*g*.

Miniaturisation provided by the host chip 210, base chip 220, and high-permeability material in the magnetic apparatus 230 enable coupling of the magnetic apparatus 230 with the base chip 220 as discussed above in relation to the integrated quantum information processing assembly 200. This coupling eliminates the need for an expensive and bulky precision XYZ positioning stage, and brings several additional benefits. For example, mechanical motion between the magnetic apparatus 230 and defect cluster 320 can result in fluctuations in the magnetic field amplitude and/or orientation at the defect cluster 320, due to spatial inhomogeneities in the magnetic field. The integrated quantum information processing assembly 200 prevents mechanical motion between the magnetic apparatus 230 and the defect cluster 320, and therefore benefits from an improved stability of the magnetic field at the defect cluster 320. Furthermore, by minimising the air gap between the magnetic layer 230 and backside 512 of the substrate 510 of the base chip 220, the distance between the magnetic apparatus 230 and the defect cluster 320 is minimised. This minimised distance increases magnetic field strength at the defect cluster 320 for a given geometry of the magnetic apparatus 230, enabling either a reduction in magnet size, or a larger magnetic field (and so enhanced qubit single-shot readout fidelity). In addition to temperature stabilisation, miniaturisation enables the possibility of (cryogen-free) cooling of the quantum information processing device 205. Cooling increases the qubit coherence time, allowing for either (1) more quantum gates to be applied during the qubit coherence time; or (2) more qubits within a cluster, at the expense of longer quantum gate durations (weakly coupled nuclei are less well-separated in frequency space, requiring slower gates for selectivity). In one implementation, a Peltier element, or stack of Peltier elements, can be used to electrically cool the quantum information processing device 205. To prevent condensation on the cooled quantum information processing device 205, the quantum information processing device 205 is preferably packaged in a controlled atmosphere or vacuum.

The magnetic field produced by permanent magnets is dependent upon temperature. To avoid overwhelming drifts in magnetic field strength, it is preferable to maintain a stable magnet temperature of the magnetic apparatus 230 to within a few tens of millikelvin over timescales of at least a few minutes. The miniaturisation provided by the integrated quantum information processing device 205 leads to a reduced thermal load thereby simplifying passive and active temperature stabilisation. Moreover, the miniaturised integrated quantum information processing device 205 is inherently less susceptible to drifts induced by thermal expansion.

The orientation of the magnetic field generated by the magnetic apparatus 230 can be aligned during the assembly process of the integrated quantum information processing assembly 200. The magnetic apparatus 230 can initially be mounted on a precision positioning stage, and its position scanned whilst monitoring the defect centre. The optimum magnetic apparatus position optimises qubit readout fidelity. With the magnetic layer optimally positioned, the magnetic apparatus 230 can be attached to the base chip 220 and detached from the precision positioning stage. Attachment can be achieved with an adhesive or other known securing techniques.

In an alternate assembling method, instead of scanning the position of the magnetic apparatus 230 to achieve a well-aligned magnetic field with the defect centre, high-precision alignment of the magnetic field with respect to the defect cluster 320 can be achieved by using a large external electromagnetic field to permanently remagnetise the magnetic apparatus 230 in an optimal direction. This can be realised by placing the integrated quantum information processing assembly 200 in a bore of a superconducting vector magnet, and adjusting the magnetic field orientation to optimise the single-shot readout fidelity of the qubit spins. Prior to this step, the permanent magnet does not require a net magnetic moment (i.e. a final magnetisation step is not required). The integrated quantum information processing assembly 200 can then be removed from the bore of a superconducting vector magnet ready for use.

In one embodiment, the base chip 220 further comprises a tunable electromagnetic field generating device 1280 (see FIG. 12) which is configurable to tune alignment of the magnetic field at the spin axis of the colour centre such that the net magnetic field at the colour centre (i.e. magnetic field generated by the magnetic apparatus and the electromagnetic field generated by the tunable electromagnetic field generating device 1280) is aligned with the spin axis. In one form, the tunable electromagnetic field generating device 1280 can include one or more pairs of crossed wires, electrically isolated from one-another and intersecting close to the position of the defect cluster 320 in the host chip. A direct current (DC) can be applied to one or both wires to create a magnetic field at the defect cluster 320 that acts to tune the orientation of the net magnetic field at the colour centre to align with the spin axis.

In one form, the host chip 210 many comprise of multiple defect clusters 320 forming a multi-quantum processor. Optical structures can be fabricated for each suitable defect cluster 320, and structured light can be used to optically address any combination of one or more qubits of the multi-quantum processor. To address individual quantum processors with electromagnetic control signals 240, the electromagnetic fields can be spatially localised, or the spin resonances of the quantum processors can be separated in frequency-space and addressed by electromagnetic fields that may be spatially delocalised. A combination of both techniques is also possible.

Figure 8:
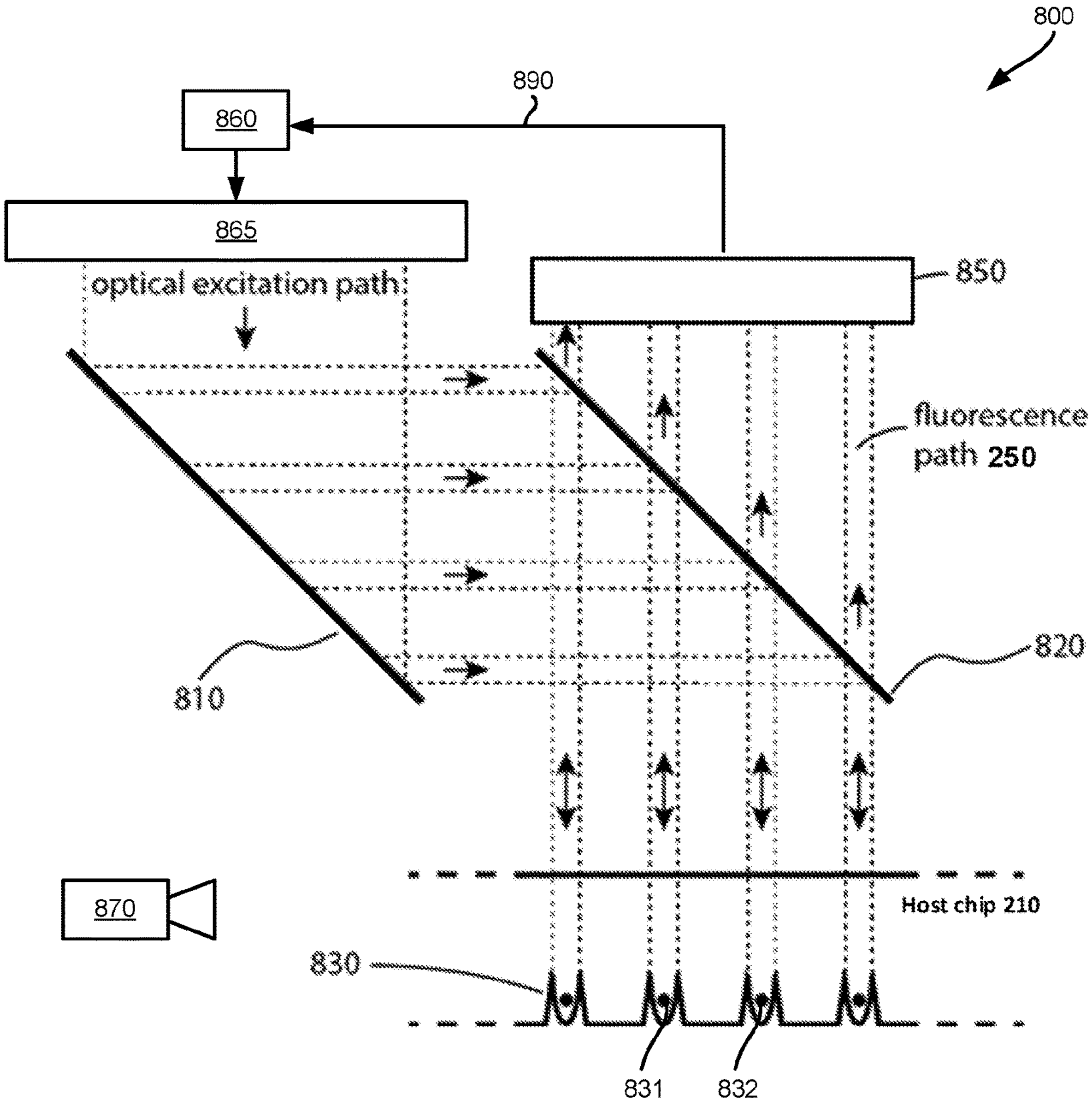
FIG. 8 is a schematic of an example of an integrated quantum information processing system.

Referring to FIG. 8 there shown a quantum information processing system 800 for optically addressing multiple quantum processors provided by a single host chip 210 having a plurality of defect clusters 320. In particular, the quantum information processing system 800, comprises an integrated quantum information processing assembly 200 or quantum information processing arrangement 600 having a plurality of defect clusters 830, a modulator 810, a light source 865, an electromagnetic control signal source 870, one or more photon detectors 850, and a controller 860 operatively coupled to the light source 865, the electromagnetic control signal source 870, and the one or more of photon detectors 850. The controller 860 is configured to actuate the light source 865 to generate one or more beams of excitation light which are modulated by the modulator 810, such that one or more beams of excitation light, as modulated, are transmitted toward the integrated quantum information processing assembly 200 or quantum information processing arrangement 600 to individually address at least some of the plurality of defect clusters 830. The controller 860 is also configured to actuate the electromagnetic control signal source 870 to individually address the at least some of the plurality of the defect clusters 830. The controller 860 is also configured to receive one or more signals 890 from the one or more photon detectors 850 in response to fluorescent light being emitted by the at least some of the plurality of defect clusters 830 which were individually addressed.

The modulator 810 can be provided in the form of a spatial light modulator or an acousto-optical modulator. The structured light can be reflected by an optical element 820 provided in the form of a dichroic mirror or beam splitter 820 to address the various quantum processors provided as multiple defect clusters 830 hosted in the same host chip 210. The fluorescence from the colour centres 830 is then transmitted through the optical element 820, and detected by the one or more photon detectors 850.

It will be appreciated that by addressing individual defect clusters 830 at different points in time, the collection of fluorescent light can be temporally associated with a particular defect cluster 831, thus only a single photon detector may be required. For example, a first excitation beam of light first enters the host chip 210 to address a first defect clusters 831 followed by a second excitation beam of light entering the host chip 210 to address a second defect cluster 832. This will result in first fluorescent light being emitted by the first defect cluster 831 followed by second fluorescent light being emitted by the second defect cluster 832. Due to this temporal actuation of the excitation beams of light, a single photon detector can be used to capture in sequence the first and second fluorescent light. In the event that multiple defect clusters 830 are to be addressed simultaneously, it is necessary to use multiple single photon detectors 850.

The electromagnetic fields localised at individual processors can be realised using multi-segment circuitry, similar to that developed for ion trap quantum computing. An advantage of this method is that any number of quantum processors can be addressed with spatially localised fields, whereas in practice (for finite magnetic gradients), crowding of the frequency space can limit the number of individually addressable frequency-separated qubits. As discussed above, the tunable electromagnetic field generating device 1280 may be utilised to tune the net magnetic field at each colour centre. To separate the spin resonances of the quantum processors in frequency space, magnetic field gradients (e.g. along the X and Y directions) can be applied across the array of quantum processors. This is advantageous as it avoids the need to generate spatially localised microwave and radio frequency fields, which requires a demanding technical overhead. In one implementation of the quantum information processing system 800, the magnetic field gradients can be realised using magnetic material of varying thickness, such as a wedge-shape.

Figure 9:
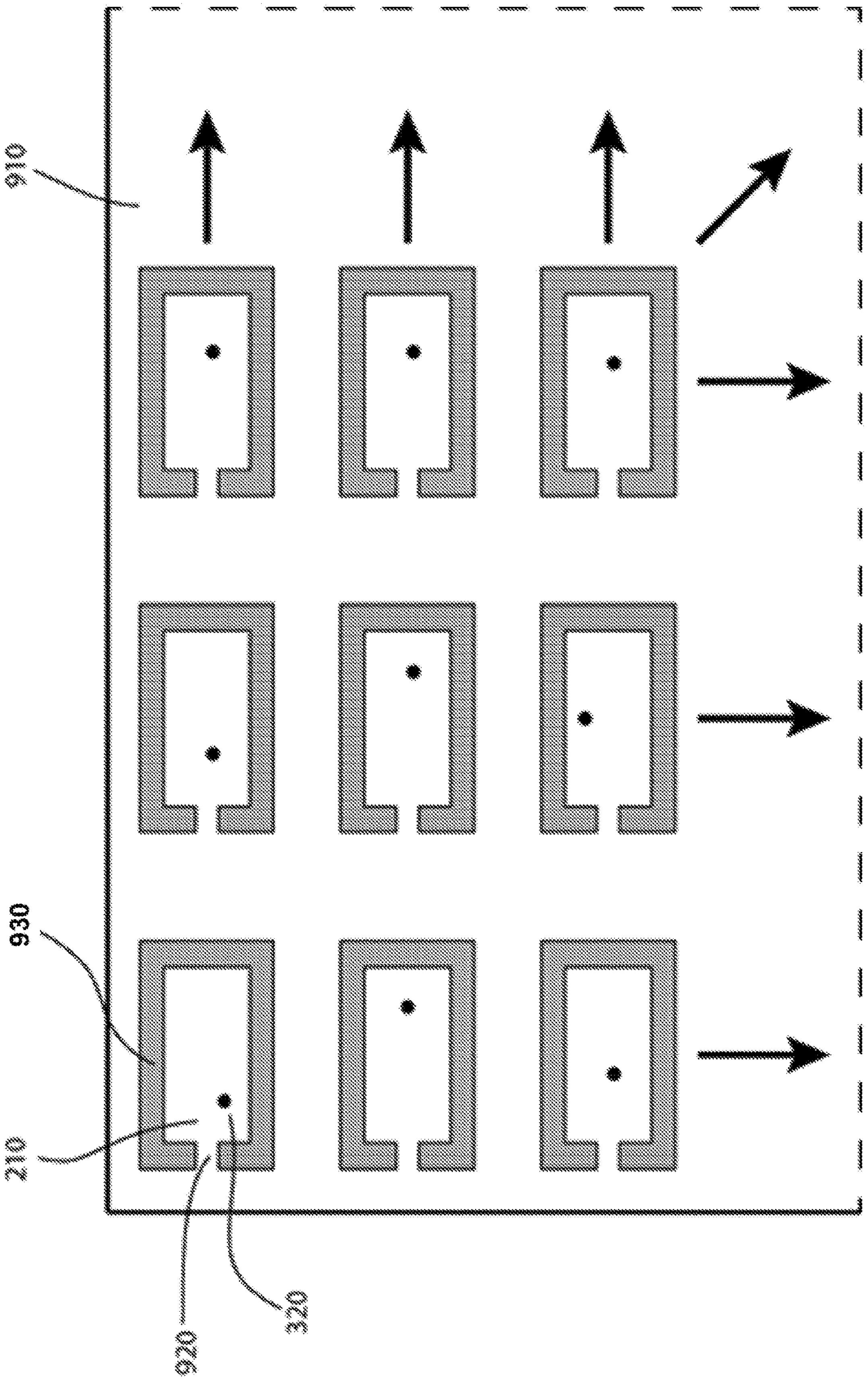
FIG. 9 is a block diagram showing an example method of fabricating a plurality of host chips in a host substrate for manufacturing an integrated quantum information processing assembly.

It will be appreciated that using current fabrication techniques, the fabrication of host chips with multiple few-qubit quantum processors is difficult to achieve on a mass scale. A scaling method to produce an integrated quantum information processing device 1000 (see FIG. 10) with multiple few-qubit quantum processors (i.e. a many-qubit processor) is described in relation to FIG. 9. In particular, a plurality of host chips 210, each with a single colour centre 320 (or small number of colour centres), are fabricated by etching 930 into a host substrate 910. The host chips 210 can be fabricated by etching 930 into the host substrate 910 such that they can be easily removed therefrom by removing host material from around each host chip 210 such that the host chips 210 are only connected to the main host substrate 910 by one or more host bridges 920. The host chips 210 can be characterised (i.e. inspected to determine if a defect cluster 320 is present), and using for example an appropriate micromanipulator, the host chips 210 with a suitable defect cluster 320 can be detached from the host substrate 910 and assembled on a base structure 220.

Figure 10:
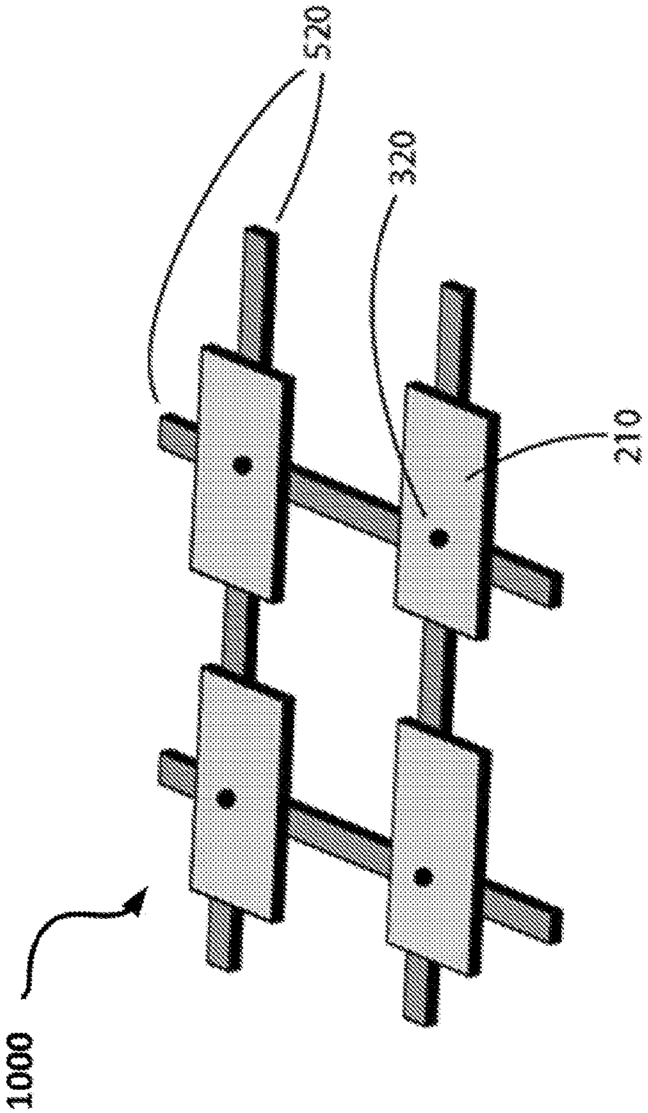
FIG. 10 is a schematic of an example of an integrated quantum information processing assembly or a quantum information processing arrangement comprising multiple host chips associated with electromagnetic control signal guiding structures of a base chip.

One implementation of an integrated quantum information processing device 1000 having multiple host chips is shown in FIG. 10, where the plurality of host chips 210 are mounted upon the guiding structure 520 of the base chip 220. The guiding structure 520 can be provided in the form of a matrix structure. One or more magnetic apparatus 230 are coupled to the base surface 512 of the base chip 220. The integrated quantum information processing device 1000 of FIG. 10 can replace the integrated quantum information processing assembly 200 or the integrated quantum information processing assembly device 600 used in the quantum information processing system 800 as discussed in relation to FIG. 8. In particular, the controller 860 is configured to actuate the light source 865 to generate one or more beams of excitation light which are modulated by the modulator 810, such that one or more beams of excitation light, as modulated, are transmitted toward the integrated quantum information processing device 1000 to individually address at least some of the plurality of defect clusters 320 of the plurality of host chips. The controller 860 is also configured to actuate the electromagnetic control signal source 870 to individually address the at least some of the plurality of the defect clusters 320. The controller 860 is also configured to receive one or more signals 890 from the one or more photon detectors 850 in response to fluorescent light 250 being emitted by the at least some of the plurality of defect clusters 320 which were individually addressed.

Referring to FIGS. 11A to 11D there is shown a schematic of the integrated quantum information processing assembly 200 or quantum information processing arrangement 600 provided in the form of a quantum sensor 1100. In particular, the quantum information processing device 205 of the assembly 200 or arrangement 600 further comprises a sampling structure 1110 thereby forming the quantum sensor 1100. The sampling structure is configured to convey a sample of interest in close proximity to the defect cluster 320. The defect cluster 320 can then be used as the quantum sensor 1100 to measure electromagnetic fields associated with the sample, or to measure changes in temperature or strain induced in the host material by the sample. The qubits of the defect cluster 320 act to enhance the sensing capabilities of the colour centre. Enhancements provided by the qubits include qubit-assisted readout to improve signal-tonoise, and enhanced coherent interaction times. Sensing can include nuclear magnetic resonance (NMR) spectroscopy, and/or electron paramagnetic resonance spectroscopy (EPR).

To ensure minimal distance between the sample of interest and the defect cluster 320 (and thus maximise sensitivity and spatial resolution/selectivity), the sampling layer 1110 can be placed directly adjacent the host chip 210. To further minimise this distance, the defect cluster 320 can be fabricated close to the same surface of the host chip 210, e.g. at a depth of approximately 10 nm. The design of optical structures around the defect cluster 320 can then be adjusted to avoid damaging the defect cluster 320, e.g. by avoiding milling the host material (e.g. diamond) from the surface near the defect cluster 320 (e.g. within 100 nm).

Figure 11A:
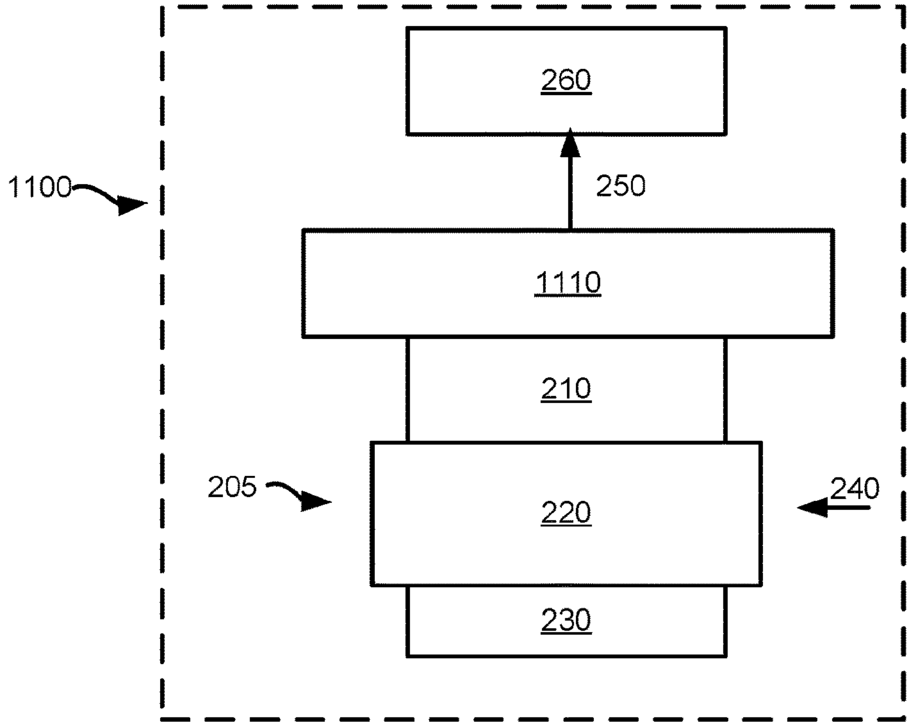
FIG. 11A to 11D are schematics of examples of integrated quantum information processing assemblies and arrangements provided in the form of a quantum sensor.
Figure 11B:
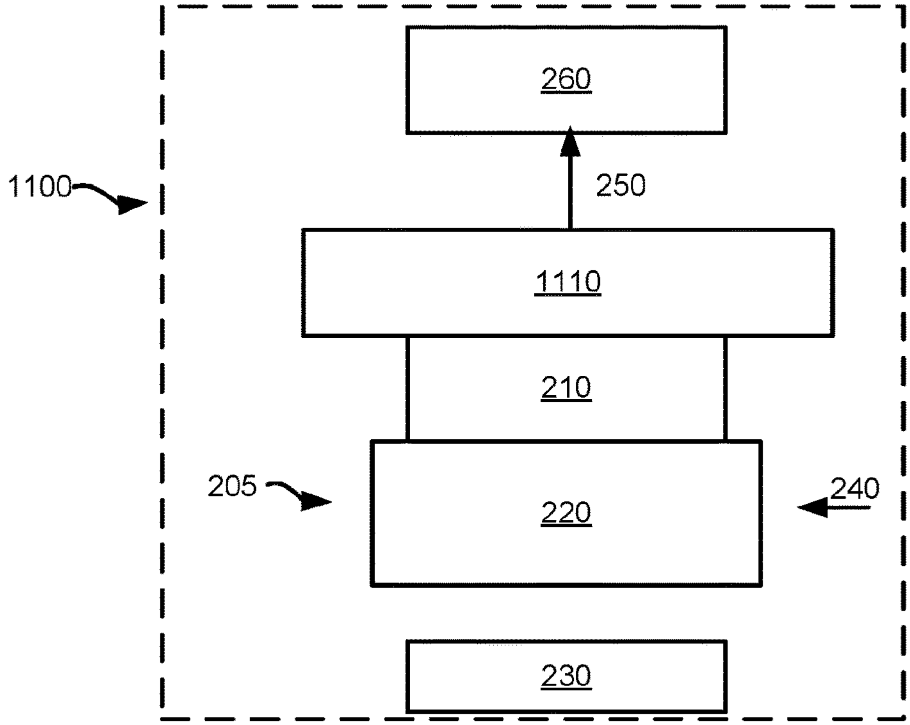

In one embodiment, the sampling structure 1110 is placed at or against the surface 312 of the host chip 210 as shown in FIGS. 11A and 11B for an assembly 200 or arrangement 600 configuration. The defect cluster 320 is then fabricated close to the surface 312. To allow optical access to the defect cluster 320 through the sampling structure 1110, the sampling structure 1110 is at least partially transparent to the excitation light and the fluorescence 250 emitted by the colour centre. This geometry allows for straightforward replacement of the sampling structure 1110, and thus straightforward exchange of samples or cleaning of the sampling structure 1110. The intensity and/or duty cycle of the excitation light may need to be limited to avoid damage to the sample.

Figure 11C:
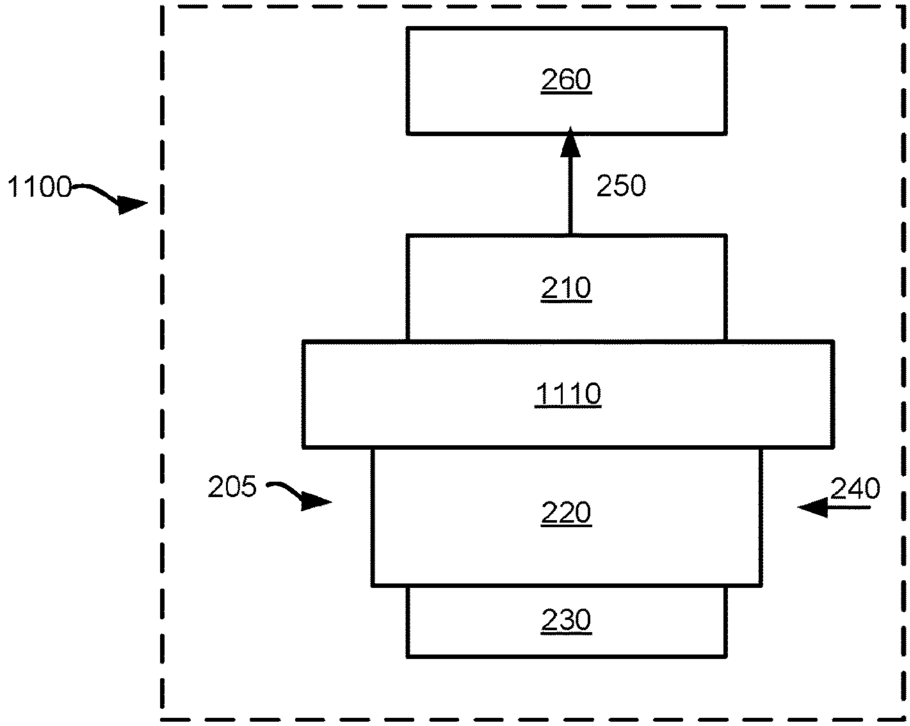
Figure 11D:
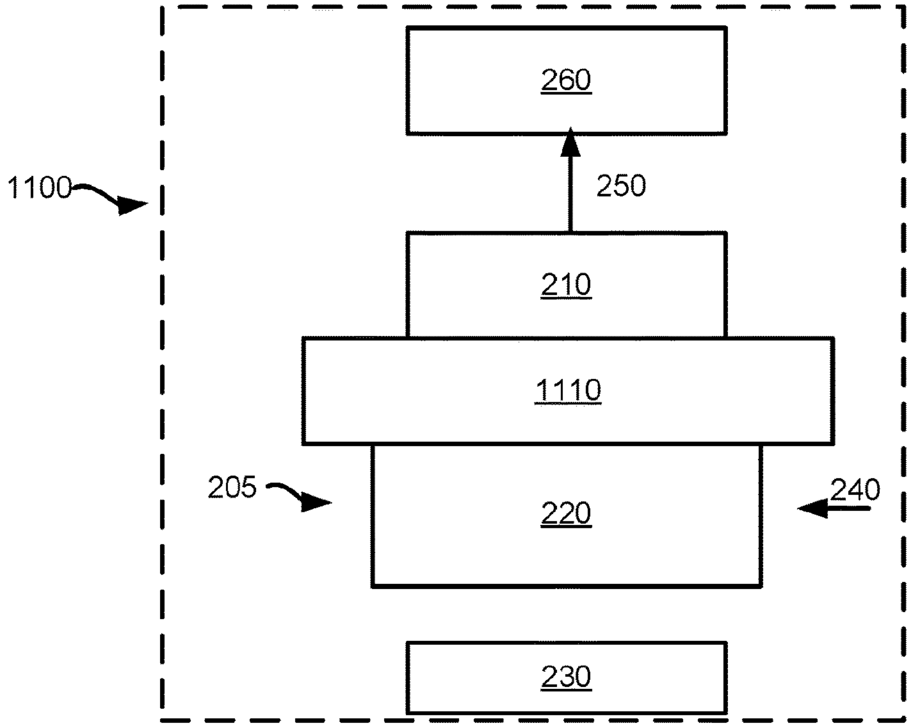

In an alternative configuration, the sampling structure 1110 is placed between the host chip 210 and the base chip 220 as shown in FIGS. 11C and 11D for an assembly or arrangement configuration. The defect cluster 320 is fabricated proximate to the back-surface of the host chip 210 relative to the front-surface of the host chip 210. This geometry ensures unimpeded optical access to the defect cluster 320, and minimises the exposure of the sample to potentially damaging excitation light. By placing the sample between the electromagnetic control signal guiding structure 520 of the base chip 220 and the defect cluster 320, the sample is potentially exposed to strong electromagnetic fields. To avoid sample damage, the amplitude and/or duty cycle of the electromagnetic control signals 240 can be reduced.

Alternatively, the sampling structure 1110 may be placed in any convenient position, at the expense of an increased separation between the sample and the defect cluster 320.

In one embodiment of the quantum sensor 1100, the sampling structure 1110 can be provided in the form of one or more microfluidic channels. The one or more microfluidic channels enable quantum sensing of ultra-small volumes of gas or liquid samples (e.g. sub-zeptolitre), down to the single-molecule level. To minimise the distance between the sample of interest and the defect cluster 320, the one or more microfluidic channels minimise a thickness of a confining wall between the sample and the host chip 210. Alternatively, the host chip 210 can be used as one of the confining walls, so that the sample is in direct contact with the host chip 210. In one form, the sample structure 1110 may be fabricated directly onto the host chip 210 of the quantum information processing assembly 200. In one option, the sampling structure 1110 could be glass which is advantageous in manufacturing where cleaning with acid of the host chip and the glass sampling structure is possible. However, it should be appreciated that other materials could be used for the sampling structure.

In another alternate embodiment, the sample can merely be deposited onto the host chip 210 of the quantum information processing assembly 200, wherein the quantum information processing assembly 200 acts as the quantum sensor 1100. In this embodiment, the sample could be e.g. a liquid droplet, or a solid.

In one form, the quantum information processing assembly 200 or arrangement 600 of the quantum sensor 1100 can comprise of a plurality of defect clusters 320. In particular, one or more of the host chips can include multiple defect clusters 320, or multiple host chips are mounted to the base chip 220 which together comprise of the multiple defect clusters 320. In this arrangement, the quantum sensor 1100 forms a quantum sensor array.

The one or more magnetic apparatus 230 of the quantum sensor 1100 are designed to provide sufficient magnetic field homogeneity over the sample. Alternatively, if the gradient of the magnetic field is well known and/or controlled via the one or more tunable electromagnetic field generating devices 1280, then this is a significant advantage as it allows different parts of the sample to be addressed.

Figure 12:
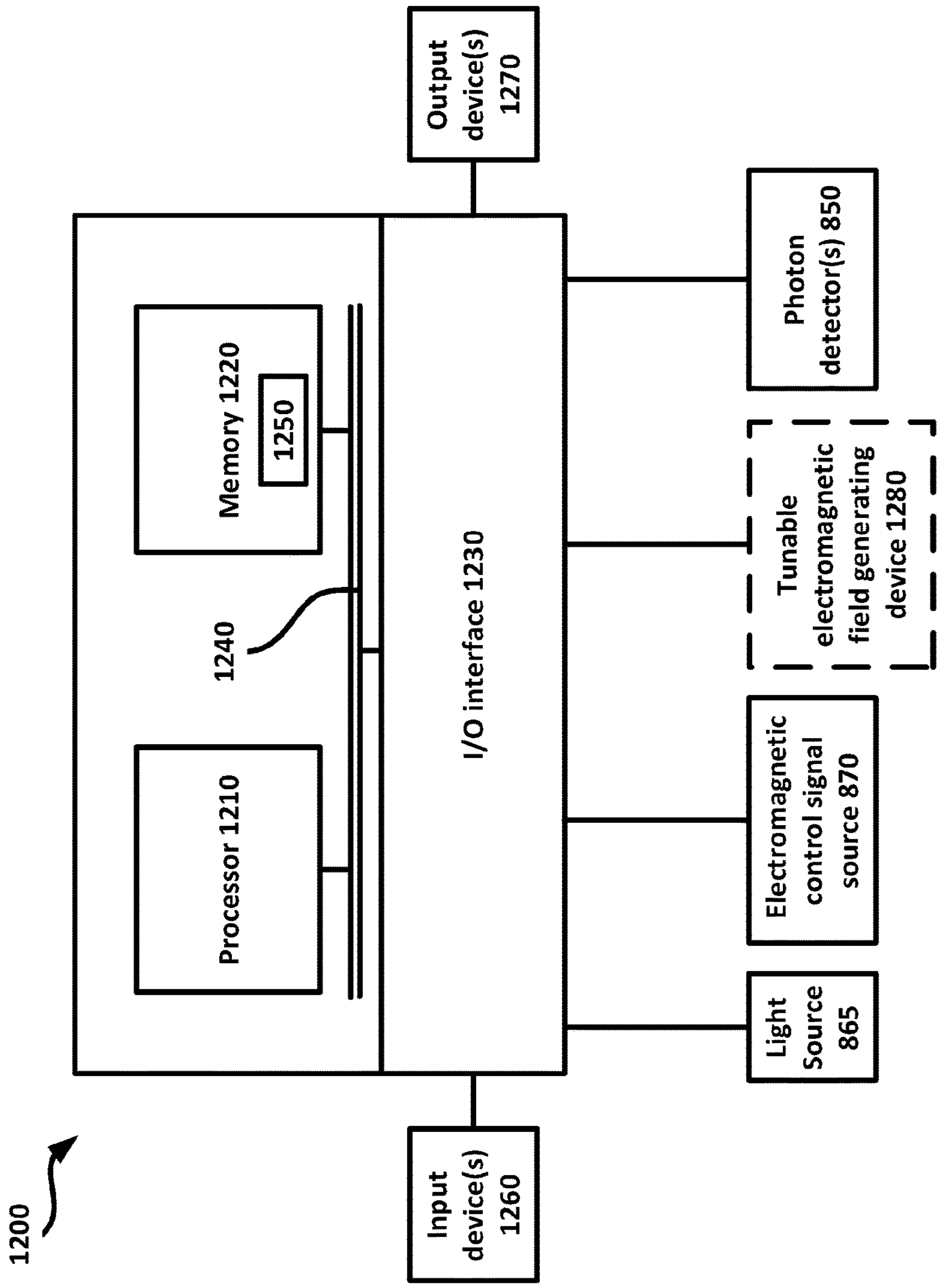
FIG. 12 is a schematic of a block diagram of an example controller suitable for use as part of the integrated quantum information processing system of FIG. 8.

Referring to FIG. 12 there is shown an example of a controller 1200 provided in the form of a processing system. The controller 1200 comprises of a processor 1210, a memory 1220, and an input/output (i/o) interface 1230 which are coupled together via a bus 1240. The memory 1220 includes volatile and non-volatile memory. The non-volatile memory can have stored therein executable instructions 1250 which are executable by the processor 1210 to perform the steps described above in relation to FIGS. 8 and 10. The i/o interface 1230 is preferably coupled to an input device 1260 for providing input instructions and an output device 1270 for outputting output results. The controller 1200 is operatively coupled to the light source 865, the electromagnetic control signal source 870, one or more photon detectors 850, and optionally (as indicated by broken line in FIG. 12) the tunable electromagnetic field generating device 1280 via the i/o interface 1230.

Many modifications will be apparent to those skilled in the art without departing from the scope of the present invention.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The invention claimed is:

1. An integrated quantum information processing device comprising:

one or more host chips, each host chip having a body, each body having a first surface, a second surface opposite the first surface, a defect cluster, and one or more optical structures formed in the respective body to direct excitation light that has entered the host chip toward the respective defect cluster and to direct fluorescent light emitted by the respective defect cluster to exit the respective host chip, wherein at least some of the one or more optical structures comprise a reflective optical structure patterned on the second surface and wherein at least some of the one or more optical structures include an anti-reflective optical structure patterned on the first surface; and a base chip having a first side coupled to the second surface of each host chip of the plurality of host chips, a second side, an electromagnetic signal guiding structure configured to guide electromagnetic control signals toward the defect cluster of each host chip, wherein the electromagnetic control signals have a frequency within at least one of a microwave or a radio frequency range;

wherein a magnetic field aligned with a spin axis at a colour centre of each defect cluster enables at least one of initialisation and readout of nuclear spin states of the respective colour centre of the respective defect cluster, for each host chip the respective defect cluster is located proximate the respective second surface relative to the first surface, and the quantum information processing device further comprises a magnetic apparatus integrated with the base chip at the second side of the base chip aligned with each defect cluster and coupled to the base chip, comprising a permanent magnet material, the permanent magnet material being arranged to generate the magnetic field at the respective colour centre of each defect cluster.

2. The integrated quantum information processing device of claim 1, wherein for each host chip the one or more optical structures comprise of a curved reflective surface at the respective second surface of the respective body configured to reflect and focus the excitation light onto the respective defect cluster and to reflect and focus the fluorescent light to exit the host chip.

3. The integrated quantum information processing device of claim 2, wherein the respective curved reflective surface of each host chip has a reflective coating.

4. The integrated quantum information processing device of claim 2, wherein for each host chip the respective reflective optical structure is formed by applying a coating or film to the respective second surface.

5. The integrated quantum information processing device of claim 1, wherein for each host chip the respective anti-reflective optical structure is formed by applying a coating or film to the respective first surface.

6. The integrated quantum information processing device of claim 5, wherein for each host chip, the respective anti-reflective optical structure is one of the one or more optical structures configured to focus the excitation light entering the host chip from the respective first surface onto the respective defect cluster and to focus the fluorescent light to exit the host chip.

7. The integrated quantum information processing device of claim 1, wherein each host chip is made of:

a diamond; or a silicon carbide.

8. The integrated quantum information processing device of claim 1, wherein the base chip further comprises one or more tunable magnetic field generating devices configured to tune the magnetic field at the respective colour centre of each defect cluster to align with the respective spin axis.

9. The integrated quantum information processing device of claim 1, wherein the magnetic apparatus comprises a first permanent magnet coupled to a second permanent magnet, wherein opposite poles of the first and second permanent magnet are coupled together.

10. The integrated quantum information processing device of claim 1, wherein the permanent magnet material has a cone shaped profile comprising a base and a peak, the permanent magnetic material being magnetised along an axis of the cone shaped profile of the permanent magnet material.

11. A quantum information processing arrangement, comprising:

the integrated quantum information processing device of claim 1; and a magnetic apparatus located proximate and separate to the base chip and configured to generate or contribute toward the magnetic field at the respective colour centre of each defect cluster.

12. The quantum information processing arrangement of claim 11, wherein the magnetic apparatus comprises a first permanent magnet having a first magnetic orientation and a second permanent magnet having a second magnetic orientation, the first magnetic orientation of being opposite to the second magnetic orientation.

13. The quantum information processing arrangement of claim 12, wherein the magnetic apparatus comprises a permanent magnet material having a cone shaped profile comprising a base and a peak, the peak being smaller than the base, the permanent magnetic material being magnetised along an axis of the cone shaped profile of the permanent magnet material.

14. A quantum sensor, comprising the quantum information processing device claim 1, further comprising a sample structure.

15. The quantum sensor according to claim 14, wherein the sample structure is located at the first or second surface of the host chip.

16. The quantum sensor according to claim 15, wherein the sample structure comprises a microfluidic arrangement provided in the first or second surface of the host chip.

17. A quantum information processing system, comprising:

an integrated quantum information processing device of claim 1, comprising a plurality of defect clusters;

a modulator;

a light source;

a microwave or radio-frequency signal generator configured to generate control signals to control spins in the plurality of defect clusters and to output the control signals to an electromagnetic control signal guiding structure, the control signals having a frequency within a radio frequency range or a microwave frequency range;

one or more photon detectors; and a controller operatively coupled to the light source, the electromagnetic control signal source, and the one or more photon detectors, wherein the controller comprises a processor and memory with executable instructions stored therein which are executable by the processor to perform the steps of:

actuate the light source to generate one or more beams of excitation light which are modulated by the modulator, such that one or more beams of excitation light, as modulated, are transmitted to individually optically address at least some of the plurality of defect clusters;

actuate the microwave or radio-frequency signal generator to individually address the at least some of the plurality of the defect clusters, and receive one or more signals from the one or more photon detectors in response to fluorescent light being emitted by the at least some of the plurality of defect clusters which were individually addressed.

18. The quantum information processing system of claim 17, further comprising an optical element configured to transmit the modulated one or more beams of excitation light toward the one or more host chips, and transmit the fluorescent light toward the one or more photon detectors.

19. The quantum information processing system of claim 18, wherein the optical element is a dichroic mirror or a beam splitter.

20. The quantum information processing system of claim 17, wherein the modulator is one of a spatial light modulator or an acousto-optical modulator.

21. The integrated quantum information processing device of claim 1, wherein the magnetic apparatus comprises a base portion of magnetically permeable material coupled to a base of the permanent magnet material.

* * * * *